(No Model.)
R. LEHMANN.
HUB ATTACHING DEVICE FOR VEHICLE AXLES.
No. 572,489. Patented Dec. 1, 1896.
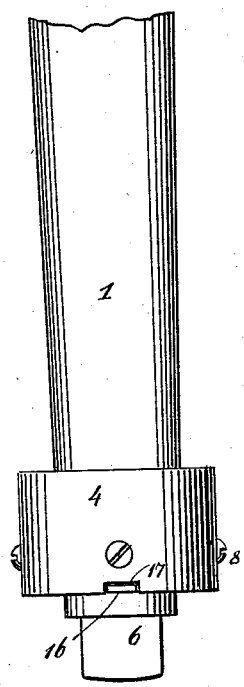
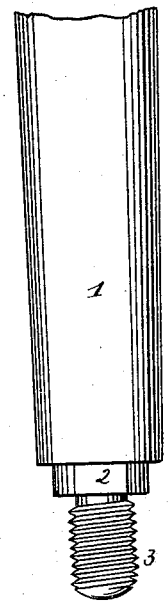
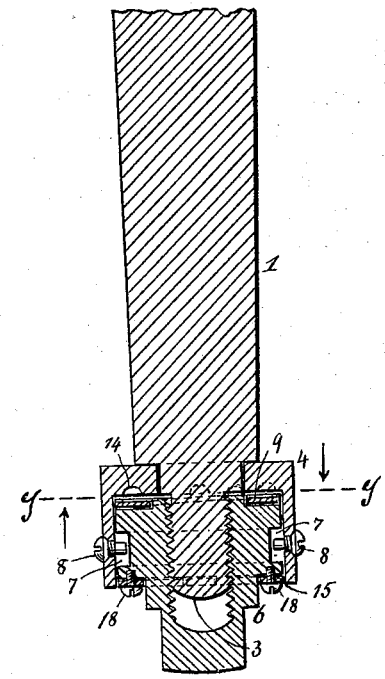
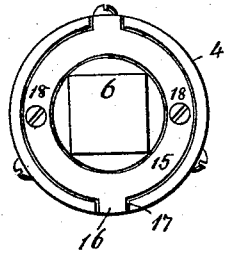
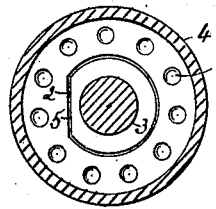
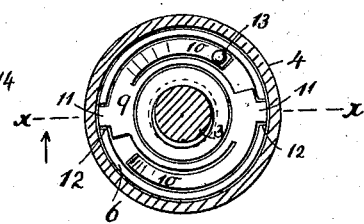
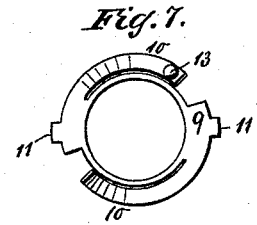
WITNESSES:
E. Wolff
Chas. E. Doensgen.
INVENTOR
Richard Lehmann.
BY
Hauff & Hauff
ATTORNEYS.

UNITED STATES PATENT OFFICE.

RICHARD LEHMANN, OF BROOKLYN, NEW YORK, ASSIGNOR OF ONE-HALF TO JOHN A. QUELL, OF SAME PLACE.

HUB-ATTACHING DEVICE FOR VEHICLE-AXLES.

SPECIFICATION forming part of Letters Patent No. 572,489, dated December 1, 1896.

Application filed May 22, 1896. Serial No. 592,650. (No model.)

*To all whom it may concern:*

Be it known that I, RICHARD LEHMANN, a citizen of the United States, residing at Brooklyn, in the county of Kings and State of New York, have invented new and useful Improvements in Vehicle-Axles, of which the following is a specification.

The object of this invention is to simplify the construction and operation and increase the security of devices by which hubs are secured to axles; and the invention resides in the novel features of construction set forth in the following specification and claims and illustrated in the annexed drawings, in which—

Figure 1 is a plan view of an axle with cap and nut. Fig. 2 is an end view of Fig. 1. Fig. 3 shows the cap and nut removed. Fig. 4 is a sectional view of Fig. 1, the section being indicated along *x x*, Fig. 6. Figs. 5 and 6 are sections along *y y*, Fig. 4, respectively looking in opposite directions. Fig. 7 is a detail view of a spring.

The axle or axle portion 1 is adapted, as known, for the support of a hub or box. (Not shown.) This axle has a non-circular or flat-faced portion or shoulder 2 and a screw-spindle 3. The axle is provided with a non-rotary cap 4, readily placed on or taken off the axle and held against rotation by the flat or non-circular portion 5, Fig. 5, of the cap sitting or fitted against the non-circular axle portion 2. A nut 6 is adapted to screw onto thread 3. This nut is connected to the cap, a circular or circumferential groove 7, Fig. 4, about the nut receiving the ends of screws 8, inserted into or through the cap, so as to hold the nut and cap together, but allowing the nut to rotate independently of the cap and also allowing the cap and nut to have longitudinal play relatively to one another.

A spring normally tends to separate or to move the nut from the cap. This spring is readily formed by a washer 9, having spring arms or portions 10. The spring is removable, but cannot rotate independently of the nut, said spring and nut having one or more engaging lugs and seats 11 and 12, compelling the spring to rotate with the nut.

The spring is shown with a boss or stud 13 and the cap with recesses or eyes 14. The stud and eyes 13 and 14 when engaging offer a certain resistance to the rotation of the nut independently of the cap, but do not positively lock the nut against such rotation, said stud and eyes being so rounded or tapered as to permit the stud to spring out of an eye on a certain rotative force being applied to the nut.

When a wheel-hub rotating on axle 1 bears against cap 4, said cap, being non-rotating and interposed between the hub and the nut 6, will prevent the rotation of the hub from rotating or unscrewing the nut. The lock formed by stud 13 and an eye 14 is sufficient to prevent the nut rattling loose or accidentally unscrewing.

To unscrew it is merely necessary by a wrench or tool to properly rotate the nut, when the latter moving or screwing away from axle 1 will draw or take along the cap 4 by the connection 7 8. Removing the screws or fastenings 8 allows separation of the cap and nut, as for cleaning or renewing the spring 9 or for other purposes.

A lock against the rotation of the nut can also be provided by a disk or diaphragm 15, detachably and non-rotatably connected to cap 4 by engaging lugs and seats 16 and 17 and secured to nut 6 by screws or fastenings 18. If now the nut is to be rotated, the fastenings 18 must be freed and the diaphragm 15 moved out of engagement with nut 4 before the nut is free to turn. It has been found, however, that the lock 15 can be dispensed with at times. The lock 15, it can be noted, may be made as not positively locking the nut by suitably tapering or rounding the portions 16 and 17, so that on the application of certain rotative force to the nut the parts 16 and 17 will release or spring out of engagement the same as the parts 13 and 14.

What I claim as new, and desire to secure by Letters Patent, is—

1. An axle provided with a non-rotary cap, a nut adapted to screw onto the axle and connected to the cap, said nut being rotatable independently of the cap and having longitudinal play respectively thereto, and a spring or washer interposed between the cap and nut for normally pressing or holding them apart substantially as described.

2. An axle provided with a non-rotary cap, a nut adapted to screw onto the axle and connected to the cap, said nut being rotatable independently of the cap and having longitudinal play respectively thereto, and a spring or washer interposed between and tending to separate the cap and nut, said spring and nut having engaging lugs and seats for connecting the spring detachably and non-rotatably to the nut, and said spring and cap having an engaging stud and recesses substantially as described.

3. An axle provided with a non-rotary cap, a nut adapted to screw onto the axle and connected to the cap, said nut being rotatable independently of the cap and having longitudinal play respectively thereto, and a spring or washer interposed between and tending to separate the cap and nut, said spring and nut having engaging lugs and seats for connecting the spring detachably and non-rotatably to the nut, said spring and cap having an engaging stud and recess, and said nut being provided with a detachable diaphragm or disk, said diaphragm and cap having engaging lugs and seats for locking the nut against rotation substantially as described.

In testimony whereof I have hereunto set my hand in the presence of two subscribing witnesses.

RICHARD LEHMANN.

Witnesses:
WM. C. HAUFF,
E. F. KASTENHUBER.